US010880951B2

(12) United States Patent
Ruttik et al.

(10) Patent No.: US 10,880,951 B2
(45) Date of Patent: Dec. 29, 2020

(54) BASE STATION FOR CONTROLLING A TRANSMISSION OF DATA PACKETS AND A METHOD THERETO

(71) Applicant: RANIOT TECHNOLOGIES OY, Espoo (FI)

(72) Inventors: Kalle Ruttik, Espoo (FI); Nicolas Malm, Espoo (FI); Olav Tirkkonen, Helsinki (FI); Riku Jantti, Espoo (FI)

(73) Assignee: RANIOT TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/543,341

(22) PCT Filed: Jan. 13, 2016

(86) PCT No.: PCT/FI2016/050015
§ 371 (c)(1),
(2) Date: Jul. 13, 2017

(87) PCT Pub. No.: WO2016/113469
PCT Pub. Date: Jul. 21, 2016

(65) Prior Publication Data
US 2018/0007736 A1    Jan. 4, 2018

Related U.S. Application Data

(60) Provisional application No. 62/102,604, filed on Jan. 13, 2015.

(51) Int. Cl.
*H04L 29/08* (2006.01)
*H04J 3/06* (2006.01)
(Continued)

(52) U.S. Cl.
CPC ........... *H04W 88/08* (2013.01); *H04J 3/0661* (2013.01); *H04L 69/324* (2013.01); *H04L 69/12* (2013.01);
(Continued)

(58) Field of Classification Search
CPC ... H04W 88/08; H04W 88/085; H04W 28/14; H04W 80/02; H04L 69/324; H04L 69/12;
(Continued)

(56) References Cited

U.S. PATENT DOCUMENTS 6,757,348 B1 * 6/2004 Vila ................... G06F 5/065
370/356
9,451,571 B2 * 9/2016 Lorenz ............. H04W 56/0065
(Continued)

FOREIGN PATENT DOCUMENTS

| CN | 104053163 A | 9/2014 |
|---|---|---|
| EP | 2 683 102 A1 | 1/2014 |
| EP | 2683102 A1 * | 1/2014 |

OTHER PUBLICATIONS

Peng, M et al. Heterogeneous cloud radio access networks: a new perspective for enhancing spectral and energy efficiencies. IEEE Wireless Communications, vol. 21, No. 6, Dec. 2014, pp. 126-135 [online], [retrieved on Mar. 21, 2016]. Retrieved from the Internet: <URL: http:// ieeexploreieee.org/xpls/abs_all.jsp?arnumber= 7000980>. The whole document, in particular sections Promising Key H-CRAN Technologies, Challenges and Open Issues in H-CRANs.
(Continued)

*Primary Examiner* — Un C Cho
*Assistant Examiner* — Lalita W Pace
(74) *Attorney, Agent, or Firm* — Nixon & Vanderhye

(57) ABSTRACT

Disclosed is a base station including at least one baseband processing unit, a front-haul network and at least one remote radio unit. The base station further includes an adaptation
(Continued)

unit configured to control transmission data packets between the baseband processing unit and at least one remote radio unit. The adaptation unit includes a buffer module and a communication module that is configured to determine if the buffer module includes at least one data packet to be transmitted at a scheduled instant of time, and in response to a detection that the at least one data packet is missing the communication module inserts padding data to the buffer module. The invention also relates to a method thereto.

10 Claims, 5 Drawing Sheets

(51) Int. Cl.
*H04W 88/08* (2009.01)
*H04W 28/14* (2009.01)
*H04W 80/02* (2009.01)
*H04L 29/06* (2006.01)

(52) U.S. Cl.
CPC ............ *H04W 28/14* (2013.01); *H04W 80/02* (2013.01); *H04W 88/085* (2013.01)

(58) Field of Classification Search
CPC ......... H04L 1/1874; H04L 7/005; H04L 7/02; H04L 12/4625; H04L 2012/5681; H04L 2012/6489; H04L 47/30; H04L 49/90; H04L 49/9031; H04L 49/9063; H04J 3/0661
See application file for complete search history.

(56) References Cited

U.S. PATENT DOCUMENTS

| | | | |
|---|---|---|---|
| 2007/0064705 A1* | 3/2007 | Tateno | H04L 1/1614 370/394 |
| 2009/0323524 A1* | 12/2009 | Kuhn | H04L 41/5022 370/230 |
| 2010/0135275 A1* | 6/2010 | Storm | H04B 1/406 370/349 |
| 2011/0310941 A1 | 12/2011 | Kenington | |
| 2012/0163299 A1* | 6/2012 | Chen | H04W 56/004 370/328 |
| 2013/0266323 A1* | 10/2013 | Tan | H04Q 11/0067 398/115 |
| 2014/0031049 A1 | 1/2014 | Sundaresan et al. | |
| 2014/0161447 A1 | 6/2014 | Graves et al. | |
| 2014/0226481 A1 | 8/2014 | Dahod et al. | |
| 2015/0146612 A1* | 5/2015 | Shor | H04B 1/0057 370/328 |
| 2017/0070983 A1* | 3/2017 | Cheng | H04W 92/12 |

OTHER PUBLICATIONS

3GPP TS 36.300 version 12.3.0 Release 12 (Sep. 2014) [online], [retrieved on Mar. 23, 2016]. Retrieved from the Internet: <URL: http://www.3gpp.org/dynareport/36300.htm>. In particular subsections 4.4, 4.6, 6.1.1, 15.1.2, 15.3.7.
Common Public Radio Interface (CPRI); Interface Specification, V6.0 (Aug. 30, 2013) [online], [retrieved on Apr. 4, 2016]. Retrieved from the Internet: <URL: http://www.cpri.infoispec.html>. In particular sections 2.1, 3.5-3.6, 4.2.8-4.2.9.
International Search Report, dated Apr. 7, 2016, from corresponding PCT/FI2016/050015 application.

* cited by examiner

BASE STATION FOR CONTROLLING A TRANSMISSION OF DATA PACKETS AND A METHOD THERETO

TECHNICAL FIELD

The invention concerns in general the technical field of telecommunications. More particularly, the invention concerns management of timing issues in packet data communications.

BACKGROUND

Traditional Radio Access Networks (RAN) comprise a plurality of stand-alone base stations (BTS). Each BTS covers a small area, whereas a group BTS provides coverage over a continuous area. Each BTS processes and transmits its own signal to and from the mobile terminal, and forwards the data payload to and from the mobile terminal and out to the core network via the backhaul. Each BTS has its own cooling, back haul transportation, backup battery, monitoring system, and so on. Because of limited spectral resources, network operators 'reuse' the frequency among different base stations, which can cause interference between neighboring cells.

The above described RAN architecture has several disadvantages. For example, BTSs are costly to build and to operate. Moreover, the BTSs may interfere each other especially in a situation when a plurality of BTSs is operating close to each other. Such a situation is common for example in city centers where there is a need to safeguard network capacity to serve a huge amount of wireless terminal within the area. On the other, as the wireless terminals are mobile, the traffic of BTSs fluctuates and, as a result, an average utilization rate of an individual BTS is pretty low. However, even if a single BTS may have unused processing resources, it cannot share them with other BTSs.

The above described disadvantages were mitigated in some 3G network implementation in which a distributed base station architecture was introduced. The distributed base station architecture refers to an implementation a remote radio head (RRH) is separated from a digital function unit (BBU) by fiber. The coupling of the RRH and the BBU with the fiber allows flexibility in network planning and deployment as it is possible to place them a distance away from each other.

A further development of the distributed base station architecture is so called Cloud based Radio Access Network (C-RAN). An example of architecture of the C-RAN is schematically illustrated in FIG. 1. The C-RAN mainly consist of a baseband processing pool 110 comprising one or more baseband processing units (BBU) 115 that are coupled to remote radio units (RRU) 130 through a so called fronthaul network 120. The distance between BBU and RRU may be kilometers or even tens of kilometers. The front-haul network may be implemented with optical links or any similar, even wirelessly. The front-haul network 120 may utilize a common public radio interface (CPRI) pro-tocol, for example. The baseband processing pool 110, in turn, is coupled to core network 150 over a backhaul network 140.

In prior art solutions the C-RAN system is configured to operate in real-time manner i.e. the baseband processing is performed in real-time. The processing is synchronized with a sample clock. Drawbacks of the prior art solutions originates from use of general purpose processors (GPP) in baseband processing in real-time. This is because in real network implementation there are too many variable parameters affecting the processing that makes the real-time processing very challenging to implement and in the worst case cause the transceiver, such as a base station, to stop operation and even to restart. Some examples of the variable parameters are load change and change in transmission rates as the transceiver, such as a base station, servers multiple terminals and the number of served terminals continuously changes. In virtualized processing environments also the processing resources may vary in time causing changes in the computation time.

Hence, there is need to mitigate at least the above described drawbacks of the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a base station and a method for enabling non-real time computation in baseband processing unit. Another objective of the invention is that the base station and the method enable controlling of a transmission of data packet.

The objectives of the invention are reached by a base station and a method as defined by the respective independent claims.

According to a first aspect, a base station comprising at least one baseband processing unit, a front-haul network and at least one remote radio unit is provided, wherein the base station further comprising an adaptation unit configured to control transmission of one or more data packets between the baseband processing unit and at least one remote radio unit, wherein the adaptation unit comprises a buffer module and a communication module, wherein the communication module is configured to determine if the buffer module comprises at least one data packet to be transmitted at a scheduled instant of time, and in response to a detection that the at least one data packet is missing the communication module is configured to insert padding data to the buffer module.

The communication module may be configured to access a memory residing in the base station for retrieving padding data stored in the memory in response to the detection that the at least one scheduled data packet is missing. The communication module may be configured to select the padding data to be retrieved from the memory at least partly on basis of radio configuration used in communication.

The padding data may comprise indication that the originally scheduled data packet is missing.

Further, the communication module may be configured, in response to a detection that the buffer module comprises at least one data packet, to determine a scheduled transmit time of the data packet in question. The communication module may also be configured to determine the scheduled transmit time of the data packet residing in the buffer module from a packet timing data received from the at least one remote radio unit. The communication module may also be configured to receive the packet timing data in at least one of the following manner: embedded in a metadata of at least one data packet transmitted from the at least one radio unit to the buffer module, by signaling between the at least one radio unit and the communication module. The packet timing data may be configured to be received in at least one of the following manner: in response to a predetermined event, periodically, upon request from the adaptation unit. The adaptation unit may further comprise a timing adjustment module that may be configured to estimate at least a transmission delay caused by the front-haul network. The timing adjustment module may be configured to estimate the transmission delay on basis of timing information included in time stamps inserted in one or more transmitted data packets by network interface units residing in the base station on both sides of the front-haul network. Moreover, the communication module may be configured to discard a data packet residing in the buffer module in response to a detection that the transmission delay received from the timing adjustment module is such that the data packet cannot be transmitted on the scheduled transmit time by the at least one remote radio unit.

Also, the timing adjustment module may be configured to generate information on at least one of the following: unsuccessful transmission of one or more data packets, transmission delay caused by the front-haul network. The base station may further be configured to determine a duration limit for processing of a data packet in the baseband processing unit based on the generated information on the transmission delay. The duration limit for processing the data packet may be determined by at least one of the following: the timing adjustment module, baseband processing unit. The baseband processing unit may be configured to compare the processing time at an instant of time to the duration limit for processing and in response to a detection that the processing time exceeds the duration limit to adjust a processing of the data packets in the baseband processing unit in order to meet the duration limit.

Further, the timing adjustment module may be configured to synchronize clock signals between that logical clock of the adaptation unit and a sample clock dedicated to another entity for handling a cooperation of the adaptation unit and the other entity having its own clock signal.

According to a second aspect, a method for controlling a transmission of one or more data packets between a baseband processing unit and at least one remote radio unit in a base station is provided, wherein the base station further comprising a front-haul network wherein the method comprising: determining, by a communication module of an adaptation unit residing in the base station, if the buffer module comprises at least one data packet to be transmitted at a scheduled instant of time, and inserting, by the communication module, padding data to the buffer module in response to a detection that the at least one data packet is missing.

The method may further comprise, in response to a detection that the buffer module comprises at least one data packet, a step of determining a scheduled transmit time of the data packet in question.

Further, the method may comprise a step of estimating at least a transmission delay caused by the front-haul network by a timing adjustment module of the adaptation unit.

The method may further comprise a step of discarding the data packet residing in the buffer module in response to a detection that the transmission delay received from the timing adjustment module is such that the data packet cannot be transmitted on the scheduled transmit time by the at least one remote radio unit.

The method may further comprise a step of determining a duration limit for processing of a data packet in the baseband processing unit based on the generated information on the transmission delay. The method may also comprise a step of adjusting a processing of the data packets in the baseband processing unit in order to meet the duration limit in response to a detection that the processing time exceeds the duration limit.

Finally, the method may comprise a step of synchronizing, by the timing adjustment module, clock signals between a logical clock of the adaptation unit and a sample clock dedicated to another entity for handling a co-operation of the adaptation unit and the any other entity having its own clock signal.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

In the context of this disclosure the network elements referred with 110, 120 and 130 are considered to form a base station in the C-RAN for the purpose of describing the present invention. The front-haul network comprises necessary devices and operations to transfer data in data packets between a baseband processing unit 115 and a remote radio unit 130. For sake of clarity the base station is marked with a box drawn with dash line. It shall be understood that the base station may also comprise other elements and functions but the ones described herein.

Figure 1:
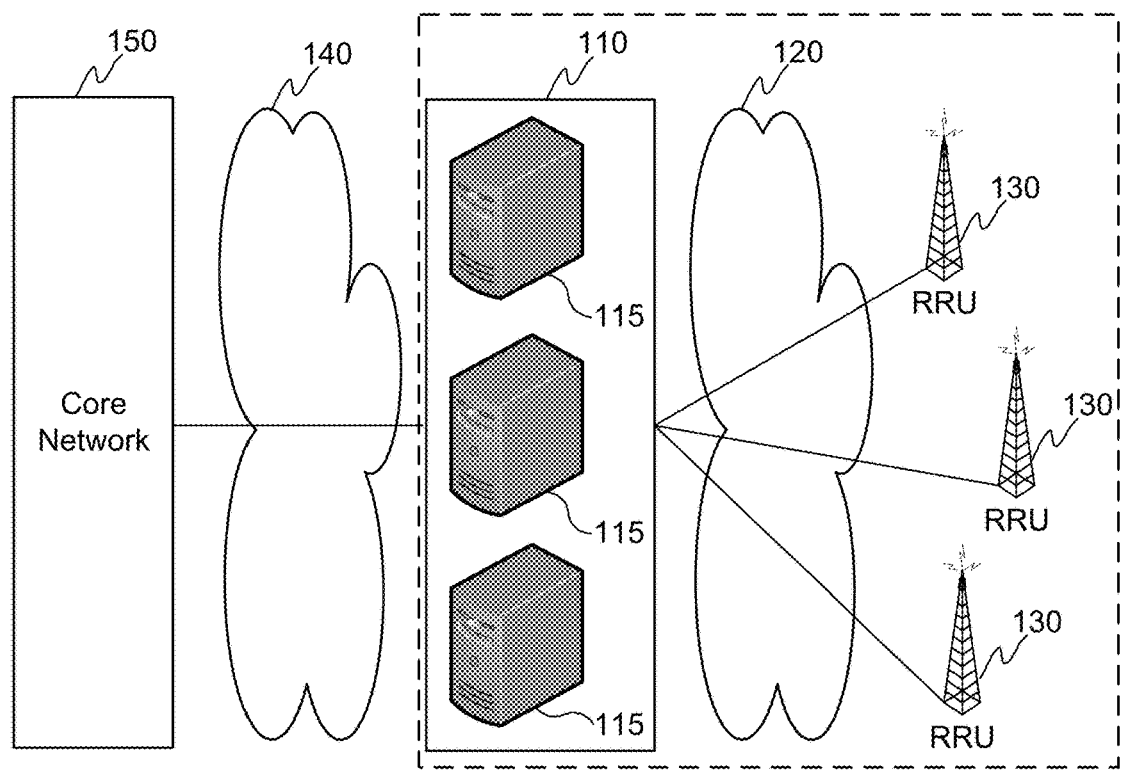
FIG. 1 illustrates schematically architecture of a C-RAN.

According to the present invention an adaptation unit (not illustrated in FIG. 1) is arranged in a base station residing in a signal path of the data packets, which adaptation unit is configured to monitor and control a delivery of the data packets between a baseband processing unit (BBU) 115 of the base station and a remote radio unit (RRU) 130. The adaptation unit may be implemented either on the BBU 115 side of the front-haul network 120 or on the RRU 130 side of the front-haul network 120.

Figure 2:
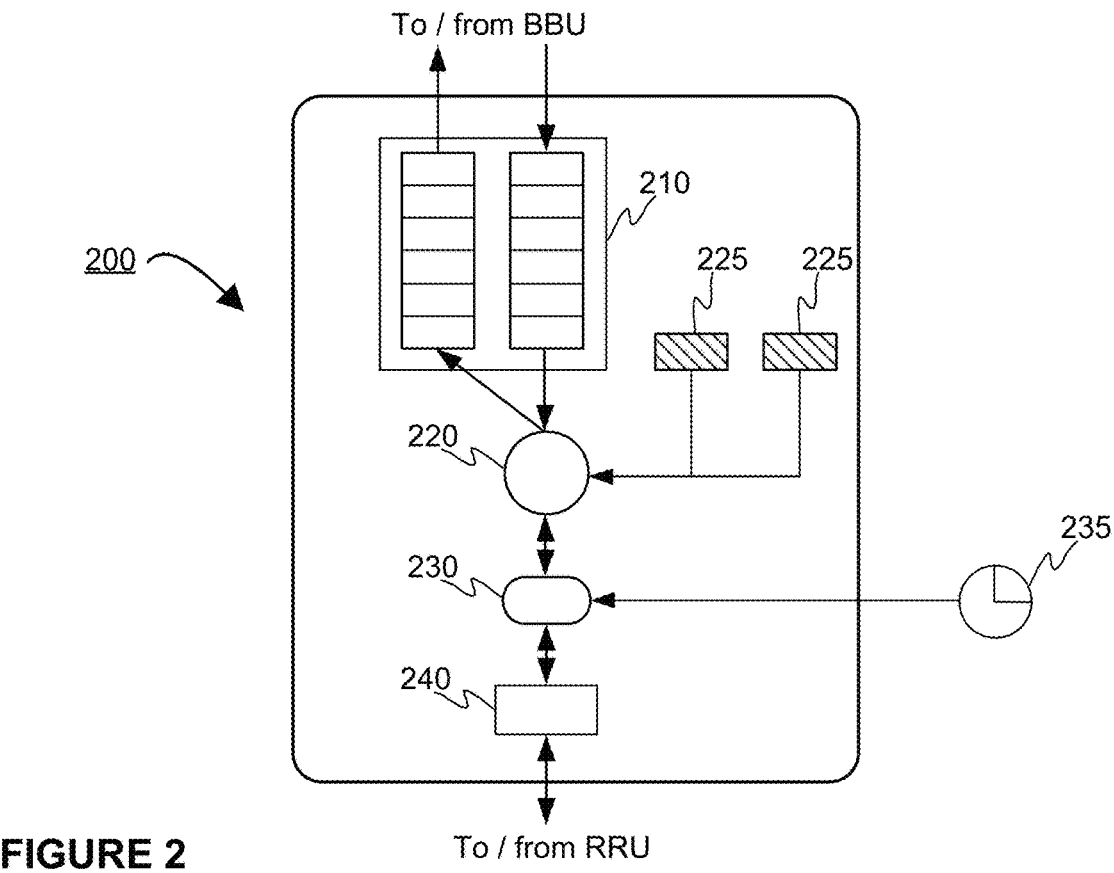
FIG. 2 illustrates schematically an adaptation unit according to an embodiment of the invention.

FIG. 2 schematically illustrates an adaptation unit 200 according to an embodiment of the invention. The adaptation unit 200 may comprise one or more processors and one or more memories that store portions of computer program code comprising instructions to cause the adaptation unit to operate as is herein described. The illustrated modules and processes in FIG. 2 may, thus, be implemented with a computer program code to be executed with at least one processor in cooperation with one or more memories residing in the adaptation unit 200. More specifically, a buffer module 210 may be arranged in the adaptation unit 200, which buffer module 210 may, for example, be a region in a memory space used to store data at least temporarily e.g. in data packets while the data is being moved from one place to another. According to an embodiment the buffer module 210 may comprise different data queues for incoming data packets and outgoing data packets. At least one queue may be reserved for data packets going to a BBU 115 (upstream) and at least one other queue may be reserved for data packets coming from the BBU 115 (downstream). In other words, a baseband process executed in the BBU 115 may prepare a data packet and deliver, i.e. write, it into to buffer module 210 at its own speed in order to communicate it downstream. The packet may comprise of a digital description of the signal to be transmitted by the transceiver. For example, the packet may consist of a digital sample-level description of the signal to be transmitted. Correspondingly, in upstream communication the baseband process may retrieve data packets from blocks in the buffer module 210 at its own speed.

Further, the adaptation unit 200 may comprise a communication module 220 that is at least configured to execute a process causing the adaptation unit 200 to control a delivery of data packets to and from the buffer module 210. According to an embodiment of the invention the communication module 220 is configured to maintain a communication channel between the BBU 115 and the RRU 130 by detecting if the buffer module 210 does not comprise any data packets for a transmission according to a schedule it is configured to obtain padding data stored in a memory accessible to the adaptation unit 200 and to transmit it to the direction of communication. The padding data is referred with 225 in FIG. 2. The advantage of the operation by the communication module 220 is that it safeguards transmission of a data packet in a scheduled time and in that manner prevents a cancellation of the communication and even the restart of the transceiver, such as a base station. The padding data to be obtained and included in a data packet to be transmitted may depend on a radio configuration i.e. subframe type or the padding data may consist of predetermined symbols, such as zeros or any other symbol string. The transceiver operation may be arranged so that the symbol string in the padding data may indicate to an entity in the transceiver that a packet originally scheduled to be transmitted is missing. The adaptation unit 200 may, for example, be configured to gather data on missing data packets and to deliver the data, or any indication on it, for example to the BBU 115 in order to provide feedback information to be used in a control of processing in the BBU. The described padding procedure may be implemented both in upstream and downstream direction. The idea is to detect if a corresponding queue in the buffer 210 is empty and in response to such detection the communication module 220 is configured to input padding data to the corresponding queue to ensure a continuous data flow.

It is worthwhile to mention that some aspects of the invention relate to monitoring that the BBU is able to process data packets in due course i.e. in a course that takes network constraints, for example, into account. Hence, if the adaptation unit 200 recognizes that the BBU cannot process, e.g. generate, a data packet in time, it is configured to obtain and to transmit padding data instead of the data packet from the BBU. In such a situation the data packet in question processed by the BBU is discarded. Similarly, if there are no symbols in the buffer when the data packet is to be read by the BBU in upstream direction, the adaptation unit 200 is configured to insert the padding data instead the symbol data.

The adaptation unit 200 may be configured to operate as disclosed above, i.e. transmitting the padding data, as long as there exists data communication into which the base station in question is involved to.

The solution as described allows non-deterministic packet processing times at least partly because the communication module 220 in the adaptation unit 200 takes care that the buffer module 210 comprises at each instant of time data to be transmitted. As a result, the baseband processing may be implemented in a non-real time operating system, A further task of the communication module 220 may, according to an embodiment of the invention, be to determine a front-haul transmission delay of each packet in the front-haul network 120. The determination of the transmission delay may e.g. be read from a metadata embedded in the data packets or the information may be transmitted separately by signaling it from remote radio unit to the adaptation unit 200, and especially to the communication module. For example, each data packet may comprise a specific field in which it is stored data that indicates the transmission time either directly or indirectly. The front-haul transmission delay information may be used for evaluating if a data packet can be transmitted at its intended instant of time by RRU when a delay of the front-haul network is taken into account. If the evaluation indicates that it is not possible to transmit the data packet at the scheduled transmission time, the communication module 220 may be configured to discard the data packet in question.

Another specific situation in the adaptation unit 200 may be if the buffer module 210, or a certain queue therein, is full of data packets and a further data packet is to be written to the buffer module, or the full queue. Such a situation may be handled so that either the new data packet is dropped or some other data packet is selected from the buffer module and it will be overwritten. Naturally, any such data packet may be dropped or overwritten whose transmit time in the RRU has already passed or they cannot be transmitted in time when the delay caused by the front-haul network is taken into account.

The adaptation unit 200 may comprise further sub-units, namely a time adjustment module 230 and a network interface unit 240. The time adjustment module (TAU) 230 receives a clock signal from a logical clock 235 that is dedicated to the adaptation unit. The time adjustment module 230 is at least configured to handle synchronization of clock signals between that logical clock 235 and a sample clock 330 dedicated to another entity, and in that manner handle a cooperation of the adaptation unit 200 and any other entity having its own clock signal in that respect. Such an entity may e.g. be the RRU 130 that performs the communication in real time and thus having a sample clock as a clock signal. The network interface unit 240, in turn, provides tools and mechanisms to coupling the adaptation unit with a network technology used in the front-haul network 120.

Figure 3:
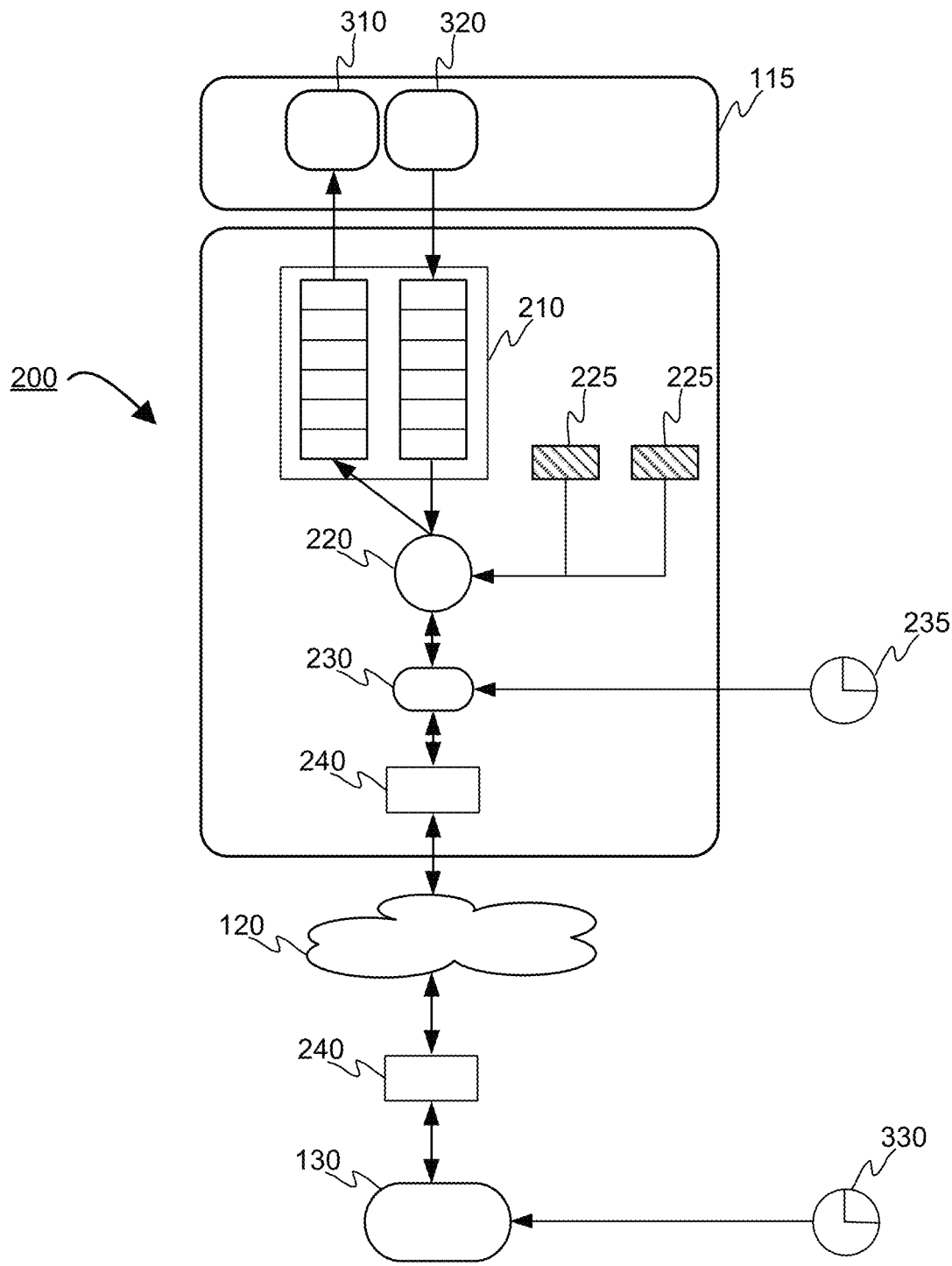
FIGS. 3 and 4 illustrate schematically implementations of the C-RAN with an adaptation unit according to embodiments of the invention.
Figure 4:
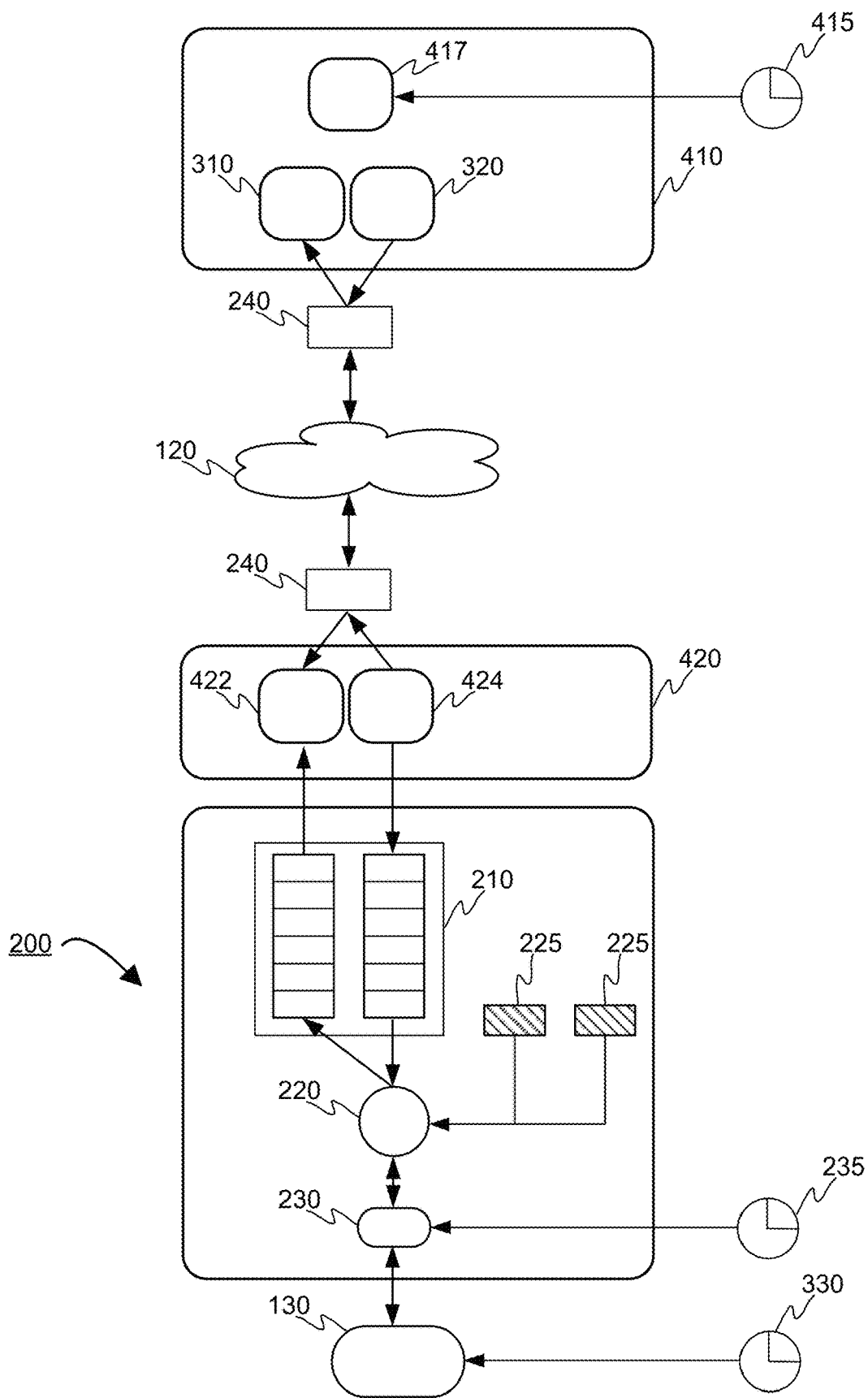

Next some further aspects of the invention are described by referring to FIGS. 3 and 4. FIG. 3 schematically illustrates an implementation of the C-RAN wherein the adaptation unit 200 resides in the BBU 115 side from the front-haul network point of view. The BBU in FIG. 3 comprises, among other units and modules, a processing part 310 for an upstream communication and a processing part 320 for a downstream communication. The processing parts are configured to communicate with corresponding queues in the buffer module 210. The BBU 115 and the adaptation unit 200 may be implemented as a single entity or two separate logical entities on general purpose computational platform. The RRU may receive its clock signal from a sample clock, referred with 330 in FIG. 3. FIG. 4, in turn, schematically illustrates an alternative implementation of the C-RAN wherein the BBU 115 and the adaptation unit 200 functionalities may be split between one or more general purpose computational platforms running on the non-real-time side of the front-haul network 120, and the RRU 130 side of the front-haul network i.e. on the real-time side. In FIG. 4, the first part of the BBU 410 may run in the general purpose computation platform and the second part of the BBU 420 as well as the adaptation unit 200 may run in a local computer connected at the RRU 130. Both parts of the BBU may comprise their own processing parts 310, 320, 422, 424 for upstream and downstream communication. Further, the BBU 410, 420 may comprise, in this kind of implementation, a unit 417 for at least partly performing the time adjustment operation. The unit 417 may receive a clock signal from a logical clock 415. Generally speaking the function split between the two BBU units 410, 420 may be arbitrary and be defined case-by-case basis.

The systems as illustrated in FIGS. 3 and 4 may have different kinds of clocks generating corresponding clock signals. A first type of clock is so called sample clock 310 that is configured to generate the clock signal in the real-time side. A second type of clock, as already mentioned, is so called logical clock 235, 415. As mentioned the timing adjustment module (TAU) 230, 415 may handle the conversion between them i.e. the first and the second type of clocks. For sake of clarity, the unit 417 refers to the part of the timing adjustment entity that is implemented on the general purpose computation platform. Both parts of the BBU entity 410, 420 and the adaptation unit 200, may or may not access the global clock that for instance can be provided by GPS. However for the invention the presence of the global clock is not necessary since the logical clocks 235, 415 may also be derived from the sample clock 330. The implementation as shown in FIG. 3 has an advantage that all non-real-time processing can be concentrated to one or more general purpose computation platforms. The implementation as shown in FIG. 4, in turn, has an advantage that the adaptation unit 200 may more accurately react to possible unreliability of the front-haul network 120. The front-haul network 120 may cause non-deterministic delays, depending on the protocol used to convey information over it.

In the following some aspects discussed above will be discussed in more detail and some further aspects are discussed.

First, some aspects relating to signaling protocol between the RRU 130 and the adaptation unit 200 are brought out. The RRU 130 may communicate with the adaptation unit 200 by sending and receiving baseband signal samples. In addition to baseband samples or descriptions of such samples, also metadata describing the number of samples and the intended transmission time need to be communicated. The RRU 130 and the adaptation unit 200 may use packet based communication. Then the metadata may be piggybacked on the data packets containing the samples. Alternatively metadata may be sent using a separate signaling connection.

Further, the RRU 130 may transmit baseband packet timing information in an event based, periodic manner, or upon request from the adaptation unit 200.

The timing information may, for example, comprise time stamps of received baseband packets and/or error indication of baseband packets missing the deadline and/or statistical information of these counters.

The timing adjustment module 230 may be configured to synchronize the timing of clocks 235 and 330. If the RRU 130 clock 330 is synchronized the timing adjustment module 230 may transmit clock correction information to RRU 130 periodically, in an event based manner, or upon request from RRU 130. The clock correction information may be piggybacked to the data packets, or transmitted on a separate signaling channel.

The RRU 130 may provide information on the clock it is using for synchronization purposes to the timing adjustment module 230. This may happen periodically, in event based manner, or upon request of the timing adjustment module 230. The time information may be expressed as a local time RRU clock 330 and/or as a count of samples.

Next some aspects relating signaling protocol between the adaptation unit 200 and the BBU 115 are brought out. It is also possible to arrange that there is a signaling connection between the adaptation unit 200 and the BBU 115. The adaptation unit 200 may e.g. inform BBU 115 on the computation time information periodically, event based or upon request of BBU 115. The computation time information may contain, for example, an estimated time available for computation and/or statistical information about the available computation and/or error indication that the BBU packet did not arrive on time or statistical information on the error events.

Next some aspects relating to timing correction at the RRU 130 is discussed. As is known a system performance depends on a clock 330 precision at the RRU 130. The RRU 130 makes signal conversion between baseband and RF. The analog digital (digital analog) conversion at RRU 130 may be given with precision of the RRU local clock 330. The RRU 130 clock 330 may be corrected by outside precise signal, for instance from GPS receiver in RRU 130 or it may be controlled by data packets from timing adjustment module 230. If the RRU local clock 330 is controlled by timing adjustment module, TAU 230, the TAU 230 may estimate the clock error and provide RRU 130 with a clock correction signal that is confined into data packet. The RRU 130 may communicate with TAU 230 either through front-haul network 120 in the embodiment as shown in FIG. 3, or locally in the embodiment as shown in FIG. 4, by sending and receiving baseband signal samples or descriptions thereof. The front-haul network 120 may use packet based communication. Beside of baseband samples each packet may also contain metadata about number of samples and transmission time. RRU 130 may also send parameters describing time of its clock 330. This time parameter may be expressed, for instance, as count of samples, or it can be RRU local time value obtained from clock 330.

The TAU 230 may have reference to the target global clock value. This value may be given for instance by GPS signal it may be distributed over core network from a center clock. The target clock may also be derived from the sample clock 330 based on the timing information provided by the RRU 130.

The TAU 230 may also compute the difference between the global clock and the RRU clock 330. This information may be sent back in the metadata of a data packet. The RRU 130 may use this information for tuning its local clock 330. The clock information may be inserted into the data packets transmitted through the network 120. Thus, the described solution does not need special hardware for distributing clock time between RRU 130 and BBU 115 or adaptation unit 200.

Furthermore, the RRU 130 contains clock 330 that provides sufficient stability over clock correction intervals. The correction information describes how much the RRU clock 330 has to be tuned. The tuning may be done with any method known in the art. For instance, by adjusting local clock (as traditionally is done by a phase locked loop), or by inserting or removing samples from AD/DA data stream.

Next some aspects relating to a method for incorporating non-deterministic front-haul transmission delay into baseband packet processing time are discussed. The front-haul network 120 may contain intermediate nodes (for instance routers, bridges) which can introduce random delays to the communication. On the other hand radio interface packet data has strict time deadline. The RRU 130, as discussed, operates with a strict sample time. The deadline means that the BBU 115 has limited processing time for baseband processing. The total time available for packet preparation consists of baseband processing time and time for communicating packet between through the network.

The timing adjustment module 230 may estimate a delay in front-haul transmission e.g. by time stamps inserted by the network interfaces 240. Based on the delay, the scheduling unit may estimate the available baseband processing time. This time may be used for scheduling the users and allocating the processing resources in BBU 115. The delay between BBU 115 and RRU 130 may be described, for example, by a distribution, or some statistical properties of a distribution. The distribution may be constructed, for instance, by sending from RRU 130 information whether the transmitted packet was late or not. It may be constructed also by measuring the required transmission time of the packet and the time when the packet arrives at the network interface 240 of RRU 130. Based on the delay information (e.g. distribution), the TAU 230 may set the time that will be reserved for transmitting the packet from BBU 115 to RRH 130. Since the actual time is a random variable with certain probability the packet could be late for transmission. In the case when packet is late it may be arranged that the delayed packet will not be transmitted. The RRU 130 may comprise some method for reacting to missing samples. It may e.g. be configured to transmit predefined padding symbols or use discontinuous transmission (DTX).

In the following an example of a method for using transmission time information between RRH 130 and BBU 115 for allocation time ahead of packet transmitted from BBU 115 is introduced. The TAU 230 may be arranged to collect information about the communication delay in the front-haul network 120 and sets the transmission time limit. This time limit may also be communicated to the scheduling unit of BBU 115. The scheduling unit may compute the available baseband processing time. This time may be used for scheduling users and for allocating processing resources in order to prepare baseband data of the scheduled users. Based on the front-haul network 120 delay information the transmission time ahead for sending the baseband packets to RRU 130 may be determined. The reserved transmission time may be set such that the outage due to the late packets is within acceptable limits.

Next an example of a method for allocating BBU 115 processing resources based on the dynamically determined available processing time is introduced. The TAU 230 may collect information on baseband packets that did not meet the transmission deadline or actual computation time using the clock 235. In addition it may collect information on the communication delay in the front-haul network 120. It may either provide this information to the BBU 115 or use it to estimate the time available for computation which is then fed back to BBU 115. Based on this information BBU 115 may estimate the resources needed for computation such that the baseband processing may be done in the given time with sufficiently large probability.

Next, some aspects of a method for controlling BBU processing based on the dynamically determined available processing time are discussed. If the BBU 115 has insufficient resources to meet the processing time constraint, the baseband processes themselves may be adapted such that they need fewer computations. This may be achieved by manipulating any or all of the transceiver chain functions including but not limited to modulation method, coding rate, number of iterations used in interactive decoding, number of iterations used in iterative processing, number of users scheduled for transmission, amount of data scheduled for transmission etc. The decision to adapt BB processing may be made based on the available processing time or the error feedback of number of lost baseband packets or other similar information.

Next some aspects relating to an embodiment of FIG. 4 in which the BBU 410, 420 and the adaptation unit 200 functionalities are split between two sides of the front-haul network 120 is discussed. As already mentioned the BBU 410, 420 and the adaptation unit 200 functionalities may be split between the sides of the front-haul network 120. The function split between the two BBU units 410 and 420 may be arbitrary. The clocks 235 and 415 in both parts of the BBU units 410, 420 may have packet level or more precise synchronization. Both parts of the BBU 410, 420 may follow the same packet numbering and the clocks in the BBU parts 410, 420 may be adjusted accordingly. The TAU 230 on the adaptation unit 200 may inform both parts of BBU 410, 420 on the computation time information periodically, in event based manner, or upon request of TAU entity 417. The adjustment to the processing time may be done in both parts of the BBU 410, 420. The parts of the BBU 410, 420 may be arranged to exchange information about the processing time adjustments in each other. The total adjustment over both parts 410, 420 may be such that the outage due to the late packets is in acceptable limits. The information exchange may be done e.g. by signaling connection between the TAU units 230, 417.

Figure 5:
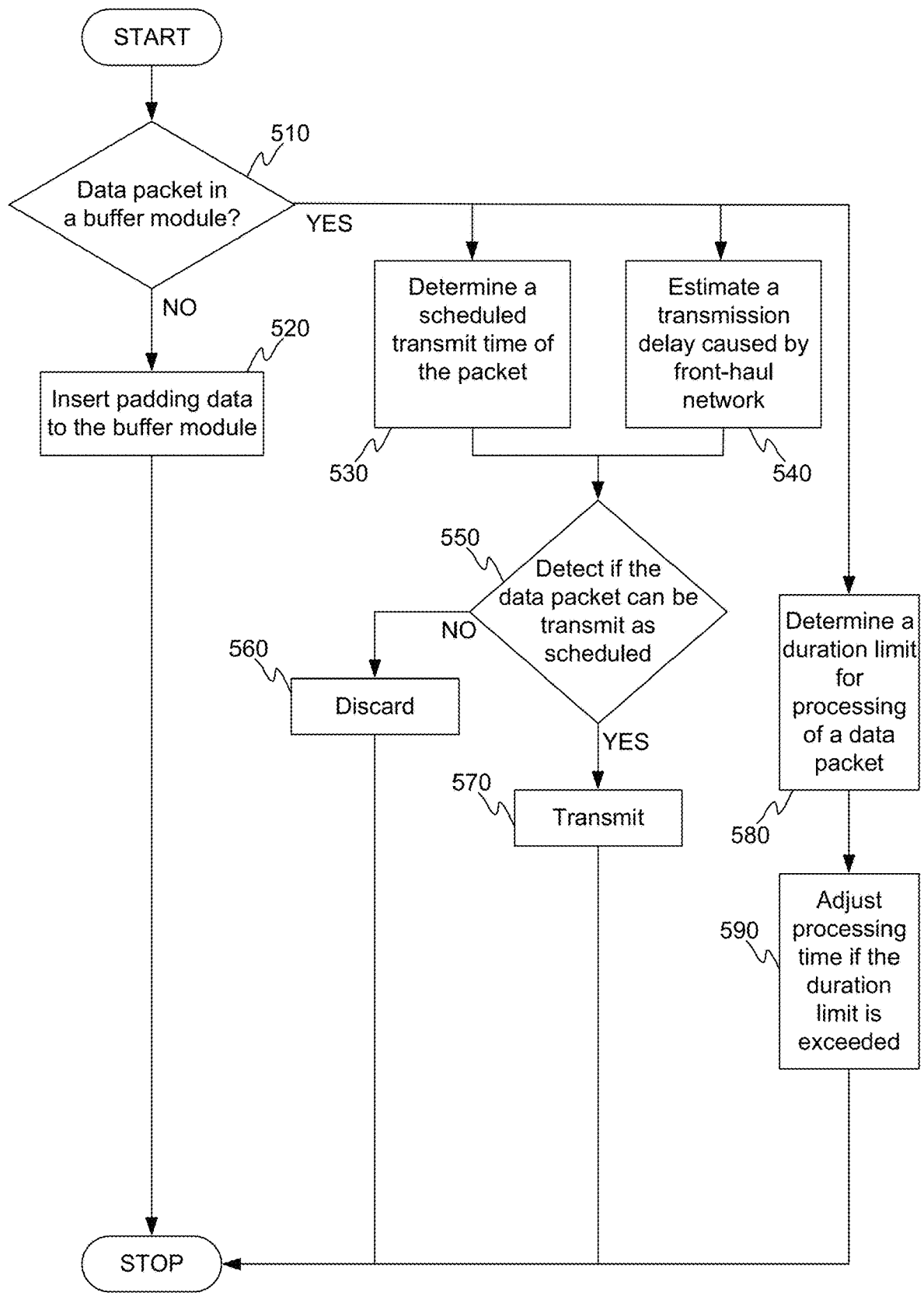
FIG. 5 illustrates schematically an example of a method according to an embodiment of the present invention.

Some aspects of a method according to the present invention are schematically disclosed in FIG. 5. The method is mainly implemented in a base station comprising at least one baseband processing unit 115; 410, 420, a front-haul network 120 and at least one remote radio unit 130. An aim of the method is to enable controlling of a transmission of one or more data packets between the baseband processing unit 115; 410, 420 and at least one remote radio unit 130. In the method, it is determined 510, by a communication module 220 of an adaptation unit 200 residing in the base station, if the buffer module 210 comprises at least one data packet to be transmitted at a scheduled instant of time.

Further, in the method in response to a detection that the at least one data packet is missing, padding data is inserted 520 to the buffer module 210.

Furthermore, the method may further comprise a step of determining 530 a scheduled transmit time of the data packet in question in response to a detection that the buffer module 210 comprises at least one data packet. The scheduled transmit time may e.g. be derived from information embedded in a metadata of one or more data packets received from RRU. Also, the information may be signaled in a separate message. The method may also comprise a step of estimating 540 at least a transmission delay caused by the front-haul network 120 by a timing adjustment module 230 of the adaptation unit 200. The steps 530 and 540 may be implemented concurrently as depicted in FIG. 5 or consecutive to each other. Further, the step 540 may be performed independently to step 510. For example, the base station may be configured to perform the estimation all the time.

Next, the base station, and especially the timing adjustment module 230 may be configured to detect 550 if the data packet residing in the buffer module may be transmitted in time if the transmission delay is taken into an account. In case the data packet cannot be transmitted in time by the RRU the data packet in question may be discarded 560. On the other hand, if it may be transmitted in time, the transmission is performed 570.

In step, 580 a duration limit of processing of the data packet or data packets may be determined. The determination may e.g. be performed by comparing a scheduled transmit time of at least one data packet to the estimation on the transmission delay and determine in that manner the time available for data packet processing at an instant of time. The step 580 is illustrated in FIG. 5 so that it is to be performed after the step 510 in the described embodiment. Even if the step 580 is illustrated in FIG. 5 to be performed in response to a detection that there is at least one data packet in the buffer module, it may also be determined also without any data packets in a buffer module. Then, the system may monitor and determine the transmission delay and based on that to conclude the duration limit, especially if the scheduled transmission times of data packets are known. Also other implementations may exists.

According to the method it is also possible to adjust 590 a processing of the data packets in the baseband processing unit 115; 410, 420 in order to meet the duration limit in response to a detection that the processing time exceeds the duration limit.

Some aspects of the method may relate to synchronization of clock signals between that logical clock 235 of the adaptation unit 230 and a sample clock 330 dedicated to another entity, and in that manner to handle a cooperation of the adaptation unit 200 and the any other entity having its own clock signal. Such other entity may e.g. be remote radio unit 130 having its own sample clock.

Above is described some aspects of the method according to the invention by referring to the FIG. 5. However, it is clear that the method may also comprise further steps that are disclosed in the description herein, but not necessarily disclosed in FIG. 5.

Figure 6:
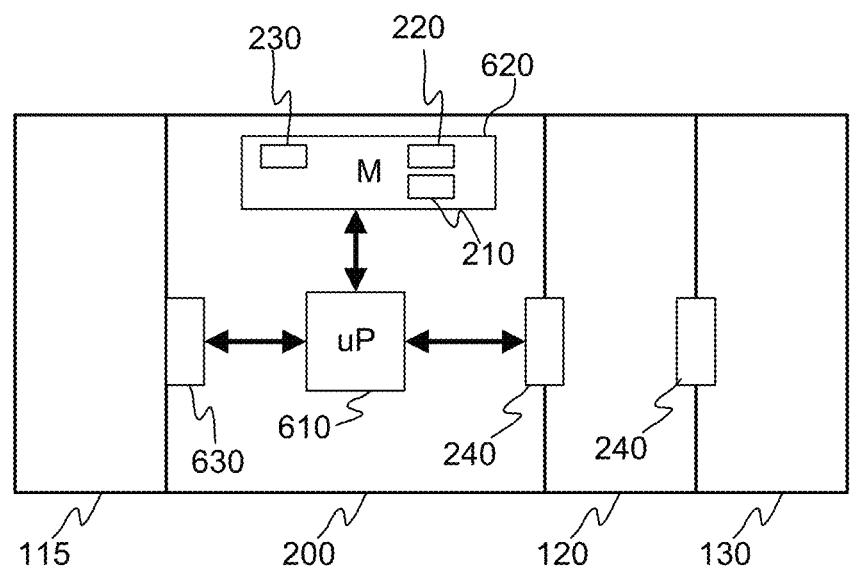
FIG. 6 illustrates schematically a base station according to an embodiment of the invention as a block diagram.

FIG. 6 schematically illustrates a base station according to an embodiment of the invention as a block diagram. The base station comprises at least one baseband processing unit 115, an adaptation unit 200, a front-haul network 120 and a remote radio unit 130. The front-haul network may comprise network interfaces on both sides that may be configured to add time stamps in data packets, as disclosed, among other tasks. The adaptation unit 200 is illustrated in more detail in FIG. 6. The adaption unit 200 may comprise, or at least have an access to, one or more processors 610 and one or more memories 620. The memory may store portions of computer program code that, when executed by the processor 610, may implement at least functions of a buffer module 210, a communication module 220 and/or time adjustment module 230. Naturally, the implementation may need other hardware resources than the processor, such as memory 620. The adaptation module may also comprise an interface 630 towards the baseband processing unit 115. The adaptation unit 200 may be configured to operate under the logical clock signal (not illustrated in FIG. 6) that may be generated with an internal clock in the adaption unit 200 or brought from an external clock. The other blocks of the base station may also comprise their own processing units and memories as may be derived from the description of the invention, or they may be configured to share resources.

To conclude at least some essential advantages of the present invention over the known solutions is that the adaptation unit as described enables packet based processing in BBU without that one need to take into account sample clock. The processing according to the present invention is implemented with its own local clock whereas the RRUs are operating under sample clock.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A base station, comprising:
a front-haul network;
a baseband processing unit at a first side of the front-haul network;
at least one remote radio unit at a second side of the front-haul network;
an adaptation unit configured to control transmission of one or more data packets between the baseband processing unit and the at least one remote radio unit via the front-haul network, the adaptation unit including a buffer module and a communication module;
a first network interface unit coupled directly to the first side of the front-haul network; and
a second network interface unit coupled directly to the second side of the front-haul network,
wherein the communication module is configured to determine whether the buffer module has stored therein at least one data packet to be transmitted, and in response to a determination that the buffer module comprises the at least one data packet to be transmitted the communication module determines a scheduled instant of time for transmission of the at least one data packet, and upon a determination that the at least one data packet is absent from the buffer module the communication module inserts padding data to the buffer module, and
wherein the base station is further configured to generate information on a transmission delay caused by the front-haul network by estimating, by a timing adjustment module of the adaptation unit, the transmission delay based on timing information included in time stamps inserted in one or more transmitted data packets by said first and second network interface units, and to determine a duration limit for a processing of data packets in the baseband processing unit based on the generated information on the transmission delay and adjust the processing of the data packets in the baseband processing unit so as to meet the duration limit.

2. The base station as claimed in claim 1, wherein the communication module is configured to determine the scheduled instant of time for transmission of the at least one data packet stored in the buffer module from a packet timing data received from the at least one remote radio unit.

3. The base station as claimed in claim 2, wherein the communication module is configured to receive the packet timing data in at least one of the following manner: embedded in a metadata of at least one data packet transmitted from the at least one remote radio unit to the buffer module, and by signaling between the at least one remote radio unit and the communication module.

4. The base station as claimed in claim 3, wherein the packet timing data is configured to be received in at least one of the following manner: in response to a predetermined event, periodically, and upon request from the adaptation unit.

5. The base station as claimed in claim 1, wherein the timing adjustment module is further configured to generate information on unsuccessful transmission of the one or more data packets.

6. The base station as claimed in claim 1, wherein the timing adjustment module is configured to synchronize clock signals between a logical clock of the adaptation unit and a sample clock dedicated to an other entity for handling a cooperation of the adaptation unit and the other entity, the other entity having its own clock signal.

7. The base station as claimed in claim 1, wherein the duration limit for processing the data packet is determined by at least one of the following: the timing adjustment module, the baseband processing unit.

8. A method for controlling a transmission of one or more data packets between a baseband processing unit and at least one remote radio unit of a base station that includes a front-haul network, the baseband processing unit at a first side of the front-haul network and the at least one remote radio unit at a second side of the front-haul network, the method comprising:
   determining, by a communication module of an adaptation unit residing in the base station, whether the buffer module comprises at least one data packet to be transmitted;
   upon determination that the buffer module comprises the at least one data packet stored therein to be transmitted,
   determining, by the communication module, a scheduled instant of time of transmission of the at least one data packet;
   upon determination that the at least one data packet is absent from the buffer module, inserting, by the communication module, padding data to the buffer module; and
   further upon the determination that the buffer module comprises the at least one data packet stored therein to be transmitted,
      generating an information on a transmission delay caused by the front-haul network by estimating, by a timing adjustment module of the adaptation unit, the transmission delay based on timing information included in time stamps inserted in one or more transmitted data packets by first and second network interface units residing in the base station, the first network interface unit coupled directly to the first side of the front-haul network and the second network interface unit coupled directly to the second side of the front-haul network,
      determining a duration limit for processing of data packets in the baseband processing unit based on the generated information on the transmission delay information,
      determining whether a processing time of data packets in the baseband processing unit exceeds the duration limit for processing of the data packets in the baseband processing unit based on the generated information on the transmission delay, and
      upon determination that the processing time exceeds the duration limit, adjusting the processing of the data packets in the baseband processing unit to meet the duration limit.

9. The method as claimed in claim 8, further comprising: discarding the at least one data packet stored in the buffer module in response to a determination that the transmission delay received from the timing adjustment module is such that the at least one data packet cannot be transmitted at the scheduled instant of transmit time by the at least one remote radio unit.

10. The method as claimed in claim 8, further comprising: synchronizing, by the timing adjustment module, clock signals between a logical clock of the adaptation unit and a sample clock dedicated to an other entity for handling a cooperation of the adaptation unit, the other entity having its own clock signal.

* * * * *